United States Patent
Anakata et al.

(10) Patent No.: US 8,447,325 B2
(45) Date of Patent: May 21, 2013

(54) MOBILE DEVICE COMMUNICATION SYSTEM AND METHOD

(75) Inventors: Joseph Anakata, Alameda, CA (US); Tasos Roumeliotis, Orinda, CA (US)

(73) Assignee: WaveMarket, Inc., Emeryville, CA (US)

(*) Notice: Subject to any disclaimer, the term of this patent is extended or adjusted under 35 U.S.C. 154(b) by 324 days.

(21) Appl. No.: 12/813,965

(22) Filed: Jun. 11, 2010

(65) Prior Publication Data
US 2010/0317368 A1    Dec. 16, 2010

Related U.S. Application Data

(60) Provisional application No. 61/186,096, filed on Jun. 11, 2009.

(51) Int. Cl.
*H04W 24/00* (2009.01)

(52) U.S. Cl.
USPC .............. 455/456.1; 455/456.2; 455/456.3

(58) Field of Classification Search
USPC ......... 455/420, 435.1, 456.1–456.3; 379/67.1
See application file for complete search history.

(56) References Cited

U.S. PATENT DOCUMENTS

| | | | |
|---|---|---|---|
| 2006/0223518 A1* | 10/2006 | Haney | 455/420 |
| 2007/0037582 A1* | 2/2007 | Mohi et al. | 455/456.1 |
| 2007/0298793 A1* | 12/2007 | Dawson | 455/435.1 |
| 2008/0133599 A1* | 6/2008 | Stewart et al. | 707/104.1 |
| 2008/0171555 A1* | 7/2008 | Oh et al. | 455/456.1 |
| 2008/0254810 A1* | 10/2008 | Fok et al. | 455/456.2 |
| 2010/0130232 A1* | 5/2010 | Dingler et al. | 455/456.3 |

* cited by examiner

*Primary Examiner* — Jean Gelin
*Assistant Examiner* — Nathan Taylor
(74) *Attorney, Agent, or Firm* — Dovas Law, P.C.

(57) ABSTRACT

A computer-implemented mobile device calling method is provided. The method includes detecting initiation of a communication between a first mobile device and a second mobile device and determining a current location of the first mobile device in response to initiation of the communication between the first mobile device and the second mobile device. The method further includes transmitting the current location of the first mobile device to the second mobile device in response to initiation of the communication between the first mobile device and the second mobile device. A system for managing distribution of location information between mobile devices is further provided.

50 Claims, 3 Drawing Sheets

MOBILE DEVICE COMMUNICATION SYSTEM AND METHOD

CROSS REFERENCE TO RELATED APPLICATION(S)

This application claims the benefit of U.S. provisional application No. 61/186,096, filed Jun. 11, 2009, which is incorporated by reference as if fully set forth.

BACKGROUND

Calling Number Identification ("CNID"), commonly called "Caller ID" is a known technology through which the telephone number of a calling party is presented to a called party once a telephone call is initiated and the called party's phone begins to ring. CNID is implemented in the Public Switched Telephone Network ("PSTN") by Signaling System No. 7 ("SS7") signaling between telephone switching centers, by Bell 202 modulation or other encoding on analog POTS lines, and by appropriate message types in digital cellular networks. Nearly every mobile telephone operator provides CNID for free to each subscriber, and a large number of analog telephone subscribers also use the service. It would be desirable and useful to provide an extension of this system to display the location of a caller in addition to the caller's name and number. It would be further desirable for a caller to receive the location of a called party.

SUMMARY

The present invention provides a computer-implemented mobile device calling method including detecting initiation of a communication between a first mobile device and a second mobile device and determining a current location of the first mobile device in response to initiation of the communication between the first mobile device and the second mobile device. The method further includes transmitting the current location of the first mobile device to the second mobile device in response to initiation of the communication between the first mobile device and the second mobile device.

The present invention further provides a system for managing distribution of location information between mobile devices comprising at least one computing device including at least one memory comprising instructions operable to enable the computing device to perform a procedure. The procedure includes detecting initiation of a communication between a first mobile device and a second mobile device, and determining a current location of the first mobile device in response to initiation of the communication between the first mobile device and the second mobile device. The procedure further includes transmitting the current location of the first mobile device to the second mobile device in response to initiation of the communication between the first mobile device and the second mobile device.

The present invention further provides non-transitory computer-readable media tangibly embodying a program of instructions executable by a computing device to implement a method, the computing device being capable of interfacing with a communications network, the method including detecting initiation of a communication between a first mobile device and a second mobile device, and determining a current location of the first mobile device in response to initiation of the communication between the first mobile device and the second mobile device. The method further includes transmitting the current location of the first mobile device to the second mobile device in response to initiation of the communication between the first mobile device and the second mobile device.

The present invention further provides a mobile device including at least one computing device including at least one memory comprising instructions operable to enable the computing device to perform a procedure comprising detecting initiation of a communication between the mobile device and another mobile device and determining a current location of the mobile device in response to initiation of the communication between the mobile device and the other mobile device. The procedure further includes transmitting the current location of the mobile device to the other mobile device in response to initiation of the communication between the mobile device and the other mobile device.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
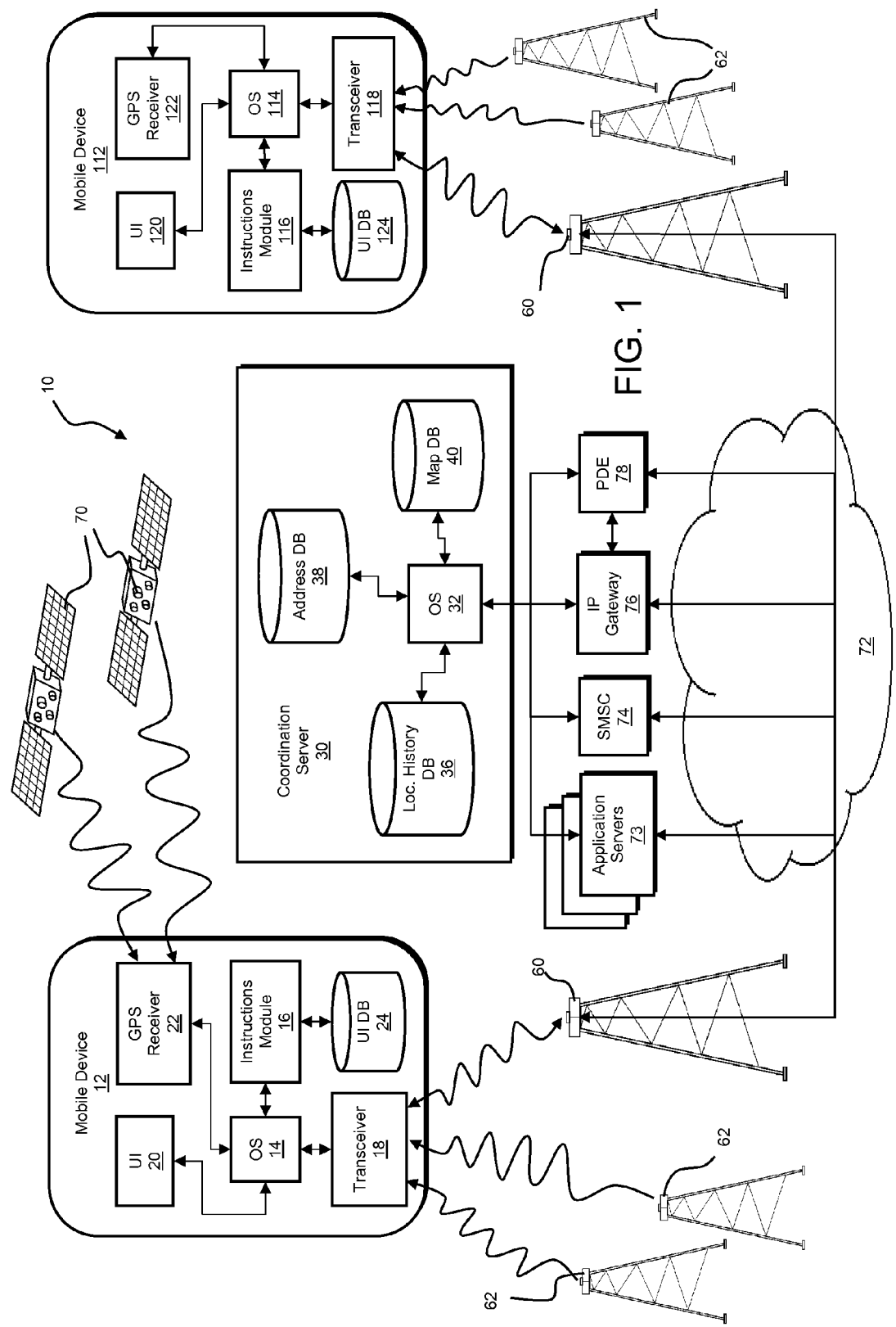
FIG. 1 is a schematic illustration of an exemplary operating environment in which mobile device communication systems are operable according to a preferred embodiment of the invention.

The preferred embodiments of the present invention are described below with reference to the drawing figures wherein like numerals represent like elements throughout.

Referring to FIG. 1, a schematic illustration is shown of an exemplary operating environment 10 in which preferred mobile device communication systems, in the form of mobile devices 12, 112 and a location caller identification coordination server 30, can be used. The mobile devices 12, 112 and coordination server 30 each include one or more computing devices and one or more memory devices, which computing devices and memory devices can be integrally constructed or connected in any suitable manner, for example integrally or via a network. It is to be understood that a server typically comprises a computer system, as known in the art.

The mobile device 12 provides a platform according to a preferred embodiment of the invention which enables an operating system 14 and a module of instructions 16 preferably residing in a memory of the mobile device 12. The mobile device 12 includes a transceiver 18 for communication with base transceiver stations 60, 62 ("base stations") and a user interface 20, preferably including a display and one or more audio speakers. A GPS receiver 22 is preferably provided for receiving signals from GPS satellites 70. The mobile device 112 is preferably identical to or similarly configured as the mobile device 12, including an operating system 114, an instructions module 116, a transceiver 118, a user interface 120, and a GPS receiver 122.

The location caller identification coordination server 30 provides a platform according to a preferred embodiment of the invention which enables an operating system 32 and memory or memories which permit operation of databases 36, 38 and 40. Preferably, mobile device location history data is stored in a location history database 36, address data corresponding to location data is stored in an address database 38 and map data, including road map data, corresponding to location data is stored in a map database 40. The coordination server 30 is preferably configured to receive location data from the mobile devices 12, 112 via a cellular telecommunication network 72. The location data is preferably received by the coordination server 30 in the form of one or more short message service ("SMS") messages received from the mobile devices 12, 112 via a short message service center ("SMSC") 74, which may be integrated with the telecommunication network 72. Alternatively, location data can be sent by the mobile devices 12, 112 using internet protocol ("TCP/IP") and received by the coordination server 30 via an internet protocol ("IP") gateway 76, which may be integrated with the telecommunication network 72. The coordination server 30 can alternatively query a remote position determining entity ("PDE") 78, a Gateway Mobile Location Center ("GMLC"), or other system for disseminating location data of mobile devices, which PDE 78, GMLC or other system may be provided as a service by a telecommunication carrier or other party, and which systems may deliver location data to the coordination server 30 via internet protocol through the IP gateway 76 or via other suitable protocol. One or more external application servers 73 execute applications which use location information provided by the mobile devices 12, 112 or the coordination server 30, and preferably receive authorizations provided by the mobile devices 12, 112 or the coordination server 30 to provide location information to other mobile devices 12, 112.

Figure 2:
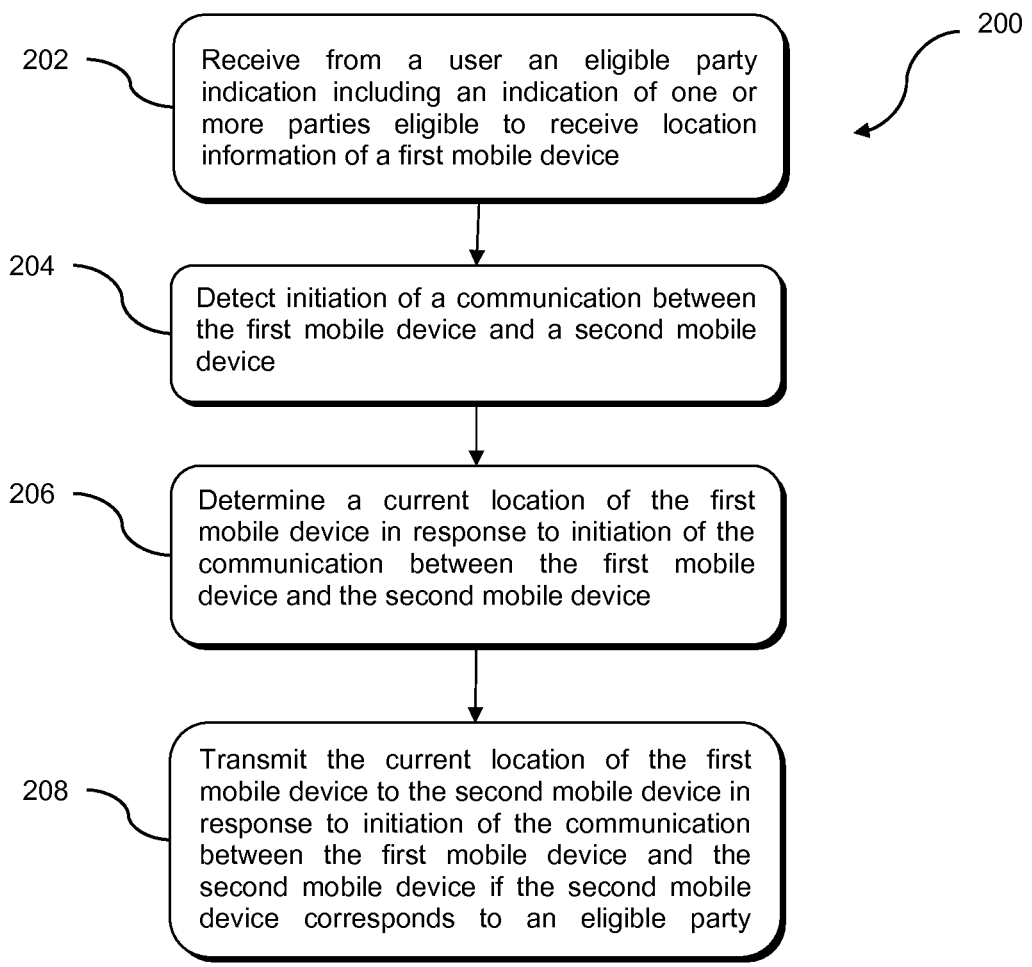
FIG. 2 is a flow chart showing a computer-implemented mobile device calling method according to a preferred embodiment of the invention.

Referring to FIG. 2, a mobile device communication method 200 is shown. The method 200 is described with reference to the preferred components shown in the operating environment 10 of FIG. 1, which components preferably include memory suitable for storing instructions for performance of the method 200. The method 200 may alternatively be performed via other suitable system or systems. The method 200 includes receiving from a user an eligible party indication including an indication of one or more parties eligible to receive location information of the first mobile device 12 (step 202). The eligible party indication is an authorization to receive location information of the first mobile device 12. The user providing the eligible party indication is preferably a user of or entity responsible for supervising operation of the first mobile device 12. Initiation of a communication between the first mobile device 12 and the second mobile device 112 is detected (step 204), and a current location of the first mobile device 12 is determined in response to initiation of the communication between the first mobile device 12 and the second mobile device 112 (step 206). The determined current location preferably includes at least a geographic coordinate of the first mobile device 12. The current location of the first mobile device 12 is transmitted to the second mobile device 112 in response to initiation of the communication between the first mobile device 12 and the second mobile device 112 if the second mobile device 112 corresponds to an eligible party (step 208).

Preferably, the determination and transmission of the current location of the first mobile device 12 is performed in response to initiation of the communication by the first mobile device 12 to the second mobile device 112. The communication is preferably a telephone call or an electronic message directed to a telephone number corresponding to the second mobile device 112 from the first mobile device 12. In such manner, a user of the second mobile device 112 is provided with the current location of a user of the first mobile device 12 when receiving a telephone call or other communication from the first mobile device 12. Alternatively, the determination and transmission of the current location of the first mobile device 12 is performed in response to initiation of the communication by the second mobile device 112 to the first mobile device 12, in which case a user of the second mobile device 112 is provided with the current location of a user of the first mobile device 12 when the user of the second mobile device 112 places a telephone call or transmits other communication type to the first mobile device 12. In either case, the current location of the first mobile device 12 is preferably transmitted as soon as possible after initiation of the communication.

An eligible party indication including an indication of one or more parties eligible to receive location information of the second mobile device 112 is also preferably received. A current location of the second mobile device 112 is preferably determined in addition to the current location of the first mobile device 12 in response to initiation of the communication between the first mobile device 12 and the second mobile device 112. The current location of the second mobile device 112 is preferably transmitted to the first mobile device 12 in response to initiation of the communication between the first mobile device 12 and the second mobile device 112 if the first mobile device 12 corresponds to an eligible party, whereby users of the first mobile device 12 and second mobile device 112 each receive the others current location. The current location of the second mobile device 112 is preferably transmitted as soon as possible after initiation of the communication.

The eligible party indication is preferably received from a user of the first mobile device 12 or the second mobile device 112 or other interested party in the form of one or more telephone numbers corresponding to the mobile device or mobile devices of one or more parties which are eligible to receive location information from the first mobile device 12 or the second mobile device 112. The eligible party indication is preferably stored locally on the respective mobile device 12, 112 in a database accessible by the respective instructions module 16, 116 which is configured to control transmission of the current location. An authorization to provide location information of a respective mobile device 12, 112 to one or more local applications executed on the mobile device, or remote applications, such as an application executed on one of the external application servers 73, can also be received from a user of the respective mobile device 12, 112 or other party with supervisory responsibility with respect to the respective mobile device 12, 112 such as a parent or employer. Access to the location information can be provided to the one or more authorized applications in response to initiation of a communication between the first mobile device 12 and the second mobile device 112.

The method according to the invention is preferably implemented via a client software application on each of the mobile devices 12, 112. Alternatively, a system for performing the method can be client firmware or hardware enabled. The client application preferably registers with mobile device control software or hardware enabled via the operating systems 14, 114 to be notified of each outgoing and incoming communication including telephone calls. The client application exposes the user interfaces 20, 120 on the respective mobile devices 12, 112 through which the user mobile device users can specify which phone numbers they call, for example from a contact list, correspond to eligible parties which are permitted to receive location information corresponding to the respective mobile device 12, 112. Alternatively, other arrangements can determine the eligible parties permitted to receive location information. In an alternative embodiment, a user subscribed to a locally administered application, or remotely administered application such as an application executed on the external application server 73, which facilitates sharing of information between fellow acquaintance, friend or family subscribers, can choose to share location information with the fellow subscribers. Such applications can include: applications provided via telecommunication carriers with plans for setting rates and implementing supervisory controls among fellow subscribers or members in a particular group, parental supervision or family safety applications, social networking applications, or other suitable applications.

Preferably, when an outgoing telephone call or other communication from the mobile device 12 is detected to a telephone number corresponding to an eligible party authorized to receive location information of the mobile device 12, the client application via the instructions module 16 attempts to collect information useful for determining the current location of the mobile device 12. The current locations of the mobile devices 12, 112 are preferably determined by the mobile devices 12, 112 through a GPS fix via signals received by the respective GPS receivers 22, 122 from GPS satellites 70, predetermined ephemeris and almanac data transmitted by the satellite. Alternatively, an estimate of mobile device location can be made from the base station identification ("ID") of the base transceiver station 60 serving the mobile device 12 or mobile device 112 and location data which correlates the base station ID with a physical location. The current location of the mobile device 12 or mobile device 112 is further determinable based on measurements of signals received from one or more of the base transceiver stations 60, 62 via the respective transceivers 18, 118 and location data providing the physical location of the one or more base transceiver stations 60, 62.

As set forth in FIG. 1, the base transceiver stations 60 represent base stations in the process of carrying a telephone call or data session between the mobile devices 12, 112 and usable for determining a current location of the mobile devices 12, 112. The base transceiver stations 62 represent base stations not currently used in the process of carrying a telephone call or data session between the mobile devices 12, 112, but which are within a reception or transmission range of the mobile devices 12, 112. Base transceiver stations 60 carrying a telephone call or data session for the mobile devices 12, 112 and base transceiver stations 62 within a reception range of the mobile devices 12, 112 can be used for transmitting signals to or receiving signals from the mobile devices 12, 112 for measurement in determining a current location of the first mobile device 12 or the second mobile device 112.

Suitable non-limiting methods for location determination based on signal measurement include but are not limited to: Angle of Arrival ("AOA"), in which the angles of arrival of signals from two base transceiver stations of known position are determined; Time Difference of Arrival ("TDOA") or Time of Arrival ("TOA"), in which lengths of time it takes to receive signals from three or more base stations of known position are determined; Enhanced Observed Time Difference ("EOTD"), in which lengths of time it takes to receive signals from three or more base stations of known position are determined based on timing data provided via the network; Advanced Forward Link Trilateration ("AFLT"), in which the device position is triangulated based on signal measurements from three or more base stations of known position by determining phase differences of the signals and signal strengths; and signal strength triangulation, in which the device position is triangulated based on signal strength measurements from three or more base stations of known position, wherein in some implementations of signal strength triangulation multipath fingerprinting is incorporated to characterize received signals. Timing Advance ("TA") values provided by a base transceiver station of known position to a mobile device can also provide the basis for calculation of a current location by triangulation or other suitable method.

The mobile devices 12, 112 preferably locally compute their respective current locations from the base transceiver station signals if signal data and base transceiver location data is available to the respective mobile device 12, 112. The initial calculation of the current location may alternatively be performed by a telecommunication carrier through a location resource residing on the telecommunication network 72, which is preferred if the signal data or the base transceiver location data is not available to the mobile device 12, 112, in which case the telecommunication carrier location resource is preferably queried by the mobile device 12, 112 to receive its current location. Alternatively, the initial calculation of the current location is performed via the coordination server 30 based on data received from the mobile device 12, 112 via the telecommunication network 72 and/or data received from a location resource of the telecommunication carrier via the telecommunication network 72.

In a preferred embodiment of the invention, the coordination server 30 receives location data and data indicative of the initiation of the communication between the first mobile device 12 and the second mobile device 112 transmitted by the first mobile device 12 via the telecommunication network 72. The coordination server 30 determines the current location of the first mobile device 12 using the location data in response to the initiation of the communication between the first mobile device 12 and the second mobile device 112. The determined current location preferably includes at least a geographic coordinate of the first mobile device 12. Thereafter, the coordination server 30 preferably transmits the determined current location to the second mobile device 112.

Location data is preferably determined by the first mobile device 12 and transmitted from the first mobile device 12 to the coordination server 30 in the form of one or more of: one or more base station IDs, one or more base station locations, angles of arrival of signals from identified base stations 60, 62, lengths of time for signals to travel between identified base stations 60, 62 and the first mobile device 12, AFLT measurements corresponding to identified base stations 60, 62, signal strength measurements from identified base stations 60, 62, and TA values corresponding to identified base stations 60, 62. The coordination server 30 is preferably configured to store an almanac or other suitable collection of physical locations of the base stations 60, 62 corresponding to base station IDs for use in determining a location of a base station based on a received base station ID from a mobile device. The stored base station locations are preferably used in determining the current location of the first mobile device 12 in conjunction with other location data including but not limited to AOA measurements, TDOA measurements, TOA measurements, EOTD measurements, AFLT measurements, signal strength measurements, and TA values. As indicated above, where multiple base station IDs corresponding to multiple base stations are associated with multiple signal measurements, accurate location determinations can typically be made through triangulation. Alternatively, a request with accompanying signal and base station ID data can be transmitted from the coordination server 30 to a position determining entity ("PDE") 78, which PDE can provide the current location, but such use of an outside system may be less expedient than performing the location determination at the coordination server 30. In cases where a GPS fix is performed locally on a mobile device, typically no additional computation is required by the coordination server 30. If required for a particular implementation of the invention, the second mobile device 112 is preferably configured to transmit location data to the coordination server 30 as described above with reference to the first mobile device 12 in response to initiation of the communication, and the coordination server 30 is preferably configured to determine and transmit the current location of the second mobile device 112 to the first mobile device 12 as described above.

The coordination server 30 can alternatively receive from the mobile device 12, 112 an identifier of the mobile device 12, 112, without any location data pertaining to the mobile device 12, 112 or an associated base station, along with a locate request. The coordination server 30 can thereafter query a PDE 78, a Gateway Mobile Location Center ("GMLC"), or other suitable resource for the current location of the mobile device 12, 112 in response to receiving the locate request. The PDE 78 or other resource may be made available by a telecommunication carrier via the cellular telecommunication network 72 or by an outside service provider. The coordination server 30 preferably communicates with the PDE 78 or other resource via the telecommunication network 72 and/or via the IP gateway 76. Alternatively, the coordination server 30 queries a suitable telecommunication carrier network resource for location data regarding the respective mobile device 12, 112 including but not limited to one or more of base station ID, base station location, AOA measurements, TDOA measurements, TOA measurements, EOTD measurements, AFLT measurements, signal strength measurements, and TA values, and uses such location data to determine a current location of the respective mobile device 12, 112.

The determined current location of the mobile device 12, 112 preferably includes a geographic coordinate including a latitude value and a longitude value corresponding to the estimated position of the mobile device 12, 112. In addition to determining a current location, one or more of an address, a road, a locality, and a point of interest corresponding to the current location of the first mobile device 12 and the telephone number of the first mobile device is preferably determined and transmitted to the second mobile device 112, and if required for a particular implementation, similar location information corresponding to the second mobile device 112 is transmitted to the first mobile device 12. A locality can include a name of a state, a city, a region, a district, a neighborhood, or any discernable location division. A point of interest can include a restaurant, a landmark, a shopping establishment, or any suitable recognizable place. Preferably, the coordination server 30 determines the address, the road, the locality, and the point of interest using a reverse geocoding method based on the determined geographic coordinate and information contained in its address database 38 and provides this information superimposed on a map generated based on map data, including road atlas map data, from its mapping database 40 to the respective mobile device 12, 112 for display via its user interface 20, 120. Alternatively, the coordination server 30 can initiate a reverse geocoding request to a remote server, such as a third party application server, to receive address, road, locality, point of interest and corresponding map data via TCP/IP or other suitable communication protocol. Alternatively, the address, the road, the locality, or the point of interest and corresponding map data can be determined locally by the mobile device 12, 112 from which the location data is generated, either via a local device database or via a reverse geocoding request to the coordination server 30 or other suitable remote server, and transmitted to the receiving mobile device 12, 112 via the telecommunication network 72 directly from the originating mobile device 12, 112. Alternatively, the current location can be sent to the receiving mobile device 12, 112 directly from the originating mobile device 12, 112 or via the coordination server 30, and the receiving mobile device 12, 112 can determine, either via a local device database or via a reverse geocoding request to the coordination server 30 or other suitable remote server, based on the current location, one or more of an address, a road, a locality, a point of interest, and a corresponding map for display via the user interface 20, 120 of the receiving mobile device 12, 112.

An SMS message indicating the initiation of a communication is preferably sent to the coordination server 30 from the first mobile device 12 via the SMSC 74 along with the current location of the first mobile device 12 or other data useful for determining the current location. In implementations wherein in addition to providing the first mobile device location to the second mobile device 112, the second mobile device location is provided to the first mobile device 12, an SMS message with the current location of the second mobile device 112 or other data useful for determining the current location of the second mobile device 112 is sent from the second mobile device 112 to the coordination server 30 either in response to a request from the coordination server 30 or independently in response to initiation of the communication. Alternatively, at or near the time the first mobile device 12 sends the SMS message to the coordination server 30, the first mobile device 12 sends an application-directed SMS message to the second mobile device 112 to request its current location, and the second mobile device 112 collects location data and sends an SMS message to the coordination server 30 with the current location of the second mobile device 112 or other data useful for determining the current location of the second mobile device 112 in response to the request of the first mobile device 12 if the first mobile device 12 corresponds to an eligible party with authorization to receive location information of the second mobile device 112. In such implementations, the collection and transmission to the coordination server 30 of location information of the first mobile device 12 and the second mobile device 112 preferably occurs substantially in parallel. The use of SMS messaging is preferable in that many cellular telecommunication networks do not currently support the use of a packet data connection simultaneously with a telephone call. Alternatively, the mobile devices 12, 112 can communicate with the coordination server 30 and each other via packet-based TCP/IP networking through the IP gateway 76, via control-plane messaging on the cellular telecommunication network 72, via SS7 signaling, or via other suitable communication.

The coordination server 30 preferably transmits the current location of the first mobile device 12, telephone number and the data obtained through reverse geocoding, including the one or more of the address, road, locality, point of interest and map corresponding to the first mobile device 12 current location, to the second mobile device 112 as an SMS message via the SMSC 74. The coordination server 30 can include in its transmission a request for the second mobile device 112 to provide the current location of the second mobile device 112 to the coordination server 30 for transmission to the first mobile device 12. The current location and related data corresponding to the second mobile device 112 is preferably sent to the first mobile device 12 from the coordination server 30 in like manner for implementations of the invention requiring mutual transmission of location information. Two or more SMS messages can be sent to a mobile device if a message content exceeds the character limit of the SMS message format. The SMS message or messages from the coordination server 30 are preferably application-directed with instructions for a client application running via the respective operating systems 14, 114 of the mobile devices 12, 112. Alternatively, the coordination server 30 can communicate with the mobile devices 12, 112 via TCP/IP through the IP gateway 76 or via other suitable communication protocol.

The mobile devices 12, 112 are preferably configured to interpret SMS message data or other communication from the coordination server 30 via the client application to provide a display or audio output via the respective user interfaces 20, 120. The second mobile device 112 is preferably configured via the client application to store in a user interface database 124 user interface data including one or more of address, road, locality, point of interest and corresponding map data, which data is correlated with data received in the SMS message or other communication from the coordination server 30 to provide a display via the user interface 120 regarding the current location of the first mobile device 12. Similarly, the first mobile device 12 is preferably configured to store in a user interface database 24 user interface data including one or more of address, road, locality, point of interest and corresponding map data, which data is correlated with data retrieved in the SMS message or other communication from the coordination server 30 to provide a display via the user interface 20 regarding the current location of the second mobile device 112. Preferably, the user interface databases 24, 124 each stores at least map data including road data, and the SMS message or other communication from the coordination server 30 provides at least a geographic coordinate corresponding to the map data stored in the user interface databases 24, 124. Alternatively, the SMS message or other communication from the coordination server 30 provides a link for the first mobile device 12 or second mobile device 112 to access corresponding address, road, locality, point of interest and map data on the coordinating server 30 via the IP Gateway 76 or on other remote system via a suitable protocol. In such a manner, excessive data is not required to be transmitted from the coordination server 30.

The data received in the SMS preferably enables the client application to display at least an estimated address corresponding to the current location and at least a vector-based map including nearby streets. More preferably, the data received in the SMS enables the client application to display a detailed bitmap or other image format from data in the respective user interface database 24, 124 or otherwise cached or downloaded from an outside source. Downloading of map or other interface data, such as data from reverse geocoding requests, during a telephone call requires that the mobile device 12, 112 supports simultaneous data and voice call transmissions. The user interface databases 24, 124 are preferably updated periodically with data from the coordination server 30 or other remote server.

During or after a communication between the first mobile device 12 and the second mobile device 112, the second mobile device 112 preferably queries the coordination server 30 or other remote server to provide the user interface database 124 with address, road, locality, point of interest and map data relevant to the current location of the first mobile device 12, if such data is not already stored therein, which query can be in the form of a reverse geocoding request via TCP/IP or other suitable communication protocol. During a communication between the first mobile device 12 and the second mobile device 112, data in the user interface database 124 relevant to the current location of the first mobile device 12 is preferably cached to permit fast access by applications operating via the operating system 114. Alternatively, to avoid use of memory and other local resources, the user interface database 124 can be omitted and data can be cached or otherwise stored in short term memory. In the same manner as described above, the first mobile device 12 can query the coordination server 30 for location information of the second mobile device 112 during or after the communication to provide current data for the user interface database 24.

If the second mobile device 112 corresponds to an eligible party, the first mobile device 12 additionally can transmit location information to the mobile device 112 in an application-directed communication, and vice versa, from time to time, at a predetermined rate, or in response to a detected location change, at times at which no communication occurs between the first mobile device 12 and the second mobile device 112. The application-directed communication can be sent as an SMS message, or via TCP/IP or any suitable protocol. Preferably, the receiving mobile device 12, 112 obtains available address, road, locality, point of interest and map data, in an above-described manner relevant to a current location of the transmitting mobile device 12, 112, to be stored in cache or other memory. Preferably, location information is not provided by a client application unsolicited to a user via the user interface 20, 120 absent initiation of a communication between the mobile devices 12, 112. In such manner, in the event of a communication with the transmitting mobile device 12, 112, the receiving mobile device 12, 112 has address, road, locality, point of interest and map data corresponding to a recently determined location of the transmitting mobile device 12, 112 cached or otherwise stored and quickly retrievable in response to receipt of the current location of transmitting mobile device 12, 112.

In a preferred embodiment of the invention, a user of a transmitting mobile device which has provided authorization to a plurality of eligible parties can transmit location information to mobile devices corresponding to the plurality of eligible parties or a select number thereof from time to time at times at which no communication is occurring. The receiving mobile devices can update address, road, locality, point of interest and map data in cache or other memory such that the when a communication is initiated between the transmitting and receiving mobile devices, address, road, locality, point of interest and map data relevant to a current location of the transmitting mobile device is available to the receiving mobile devices. Such a method would be particularly suitable to a limited number of eligible parties, for example parties subscribed to a locally or remotely administered application which permits sharing of information between fellow acquaintance, friend and family subscribers, who can choose to share location information with the fellow subscribers. Such applications can include: applications provided via telecommunication carriers with plans for setting rates and implementing supervisory controls among fellow subscribers or members in a particular group, parental supervision or family safety applications, social networking applications, or other suitable applications.

The coordination server 30 can alternatively be omitted from the operating environment 10. In such case, the current location of the first mobile device 12, corresponding data obtained through reverse geocoding, and phone number associated with the first mobile device 12 is preferably transmitted to the second mobile device 112 directly from the first mobile device 12, and vice versa if required, via the telecommunication network 72 in response to initiation of the communication between the first mobile device 12 and the second mobile device 112. The current location and related data are preferably sent to the respective mobile device 12, 112 in the form of one or more SMS messages. The one or more SMS messages are preferably application-directed with instructions for an application running via the operating system 114 of the second mobile device 112 or the operating system 14 of the first mobile device 12. The first mobile device 12 can include in the SMS message to the second mobile device 112 a request for its current location or include such request in a separate SMS message to trigger collection and transmission of location information from the second mobile device 112. The mobile device 12, 112 preferably correlates data in the SMS or other communication with address, road, locality, point of interest or map data relevant to the current location in the respective user interface database 24, 124 or remote server to provide a video or audio output via the user interface 20, 120. Alternatively, the mobile devices 12, 112 can communicate with each other via packet-based TCP/IP networking through the IP gateway 76, via control-plane messaging on the cellular telecommunication network 72, via SS7 signaling, or via other suitable communication.

The coordination server 30 is preferably configured to store in a location history database 36 prior determined current locations, and addresses, roads, localities, points of interest, mapping data, or other data corresponding to the prior determined current locations of the first mobile device 12 at the initiation of or during one or more current or prior communications with other mobile devices. The coordination server 30 is configured to receive a request from a requester, which requester may or may not be associated with the second mobile device 112 or other mobile device, for the prior determined current locations, or addresses, roads, localities, points of interest, mapping data, or other data corresponding to the prior determined current locations of the first mobile device 12. The coordination server 30 transmits to the requester the requested data if the requester corresponds to an eligible party of the eligible party indication. In such manner, eligible parties may access historic location data corresponding to communications of the first mobile device 12. In an alternative embodiment, a user subscribed to a locally or remotely administered application which permits sharing of information between predetermined acquaintance, friend and family fellow subscribers, can choose to share historic location data with the predetermined fellow subscribers. Such applications can include: applications provided via telecommunication carriers with plans for setting rates and implementing supervisory controls among fellow subscribers or members in a particular group, parental supervision or family safety applications, social networking applications, or other suitable applications. Historic location data accessible to a particular eligible party can alternatively be limited to location data corresponding to communications between the first mobile device 12 and a device corresponding to the particular eligible party.

The current location of a mobile device and data corresponding to the current location such as address, road, locality, point of interest and map data can be determined via more than one method, which may correspond to different processing times for generation and transmission of data from the coordination server 30 or from a located mobile device. Preferably, mobile device location data is transmitted from an originating mobile device or the coordination server 30 as soon as it becomes available. A current location of the first mobile device 12 can be performed using a first method and transmitted to the second mobile device 112 directly or via the coordination server 30. The current location determined using a second method can be transmitted to the second mobile device 112 after transmission of the current location determined using the first method. The first method can correspond to a relatively quick process such as determining a base station location whereas the second method can correspond to a relatively more intensive and lengthy process such as a determining a GPS or AFLT location fix or generation of address, road, locality, point of interest and map data via a reverse geocoding request or other procedure. In such case, an example first message transmission to the second mobile device 112 corresponding to a relatively less precise location method can read: "Approximate location of caller is the neighborhood of Society Hill, city of Philadelphia", and an example second message to the second mobile device 112 corresponding to a relatively more precise location method can read: "Caller's accurate location determined: 3XX Pine Street, city of Philadelphia". In such manner, location information is quickly transmitted to the receiving device as it becomes available.

Preferably, during a communication such as a telephone call, the first mobile device 12 collects and transmits updated location data to the coordination server 30 at a predetermined rate or upon detecting changes in its location. Preferably, a detected change in location must exceed a predetermined threshold to trigger transmission of updated location data by the first mobile device 12. The coordination server 30 determines an updated current location of the first mobile device 12 using the updated location data and transmits the updated current location along with related address, road, locality, point of interest and map data to the second mobile device 112. Alternatively, the first mobile device 12 can determine the updated current location without use of the coordination server 30 and transmit the updated current location and related data to the second mobile device 112 directly or via the coordination server 30. Updated current location and related data corresponding to the second mobile device 112 is preferably sent to the first mobile device 12 in a like manner if required for a particular implementation of the invention.

In addition to transmission of current location of the first mobile device 12 and related data to the second mobile device 112, the current location and related data can be transmitted, directly from the first mobile device 12 or via the coordination server 30, to one or more other authorized mobile devices corresponding to one or more other eligible parties, for which an eligible party indication has been received, in response to an initiation of a communication between the mobile devices 12, 112. In such manner for example, a party with supervisory responsibility with respect to first mobile device 12 can be immediately notified of its location when a communication is initiated with the second mobile device 112 or other mobile device.

Figure 3:
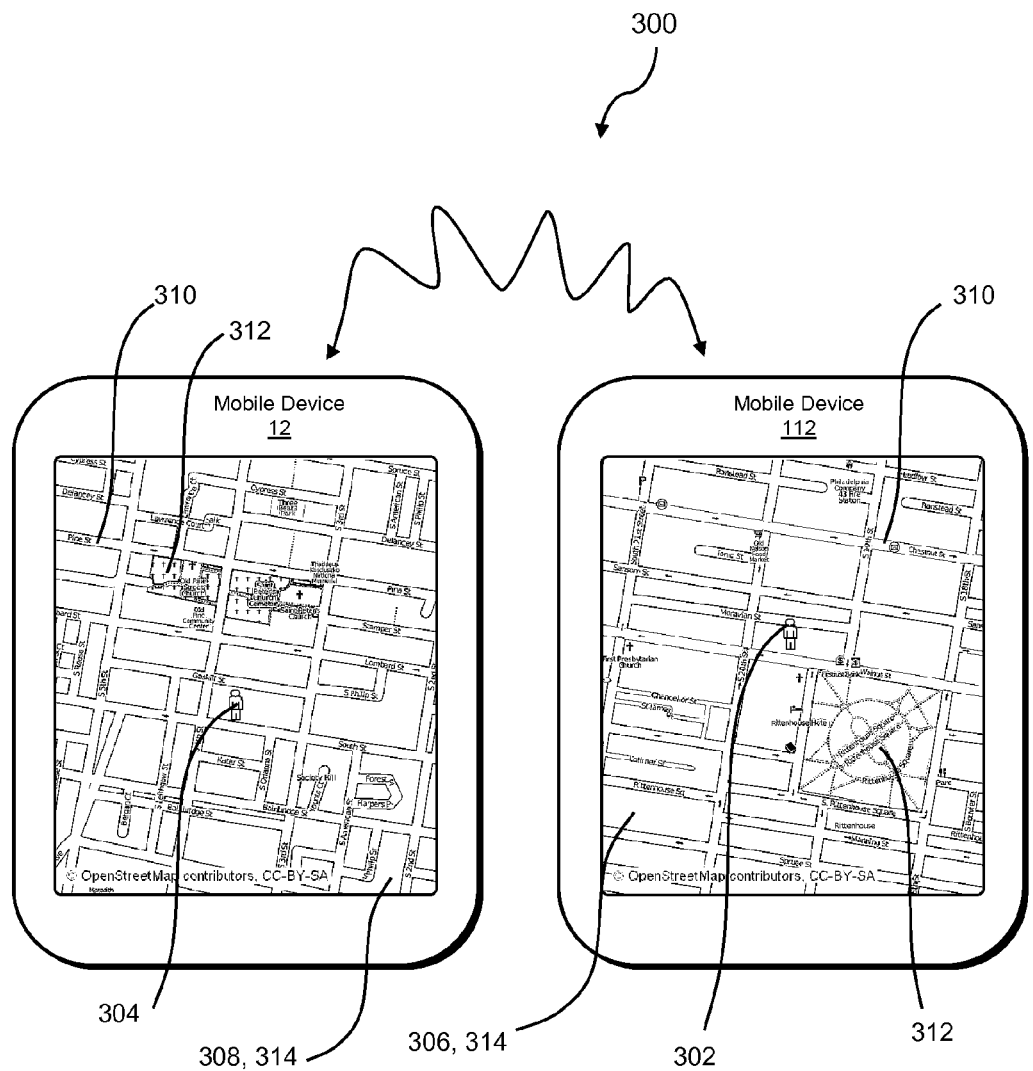
FIG. 3 is an illustrative example of a first mobile device in communication with a second mobile device according to a preferred embodiment of the invention.

Referring to FIG. 3, an illustrative example 300 of the first mobile device 12 and the second mobile device 112 during a communication between the mobile devices 12, 112, such as a telephone call, is shown according to a preferred embodiment of the invention. The mobile device 12 is located at a first position 312 as shown on a display 306 of the user interface 120 of the second mobile device 112. The second mobile device 112 is located at a second position 304 as shown on a display 308 of the user interface 20 of the first mobile device 12. The positions 302, 304 are shown relative to roads 310 and points of interest 312 over maps 314 generated according a preferred method of the invention.

The present invention further provides according to a preferred embodiment non-transitory computer-readable media tangibly embodying a program of instructions executable by a computing device to implement a method, the computing device being capable of interfacing with a communications network, the method including detecting initiation of a communication between a first mobile device and a second mobile device. The method further includes determining a current location of the first mobile device in response to initiation of the communication between the first mobile device and the second mobile device, and transmitting the current location of the first mobile device to the second mobile device in response to initiation of the communication between the first mobile device and the second mobile device. As stated herein non-transitory computer-readable media comprises all computer-readable media except for a transitory, propagating signal.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented mobile device calling method comprising:
   providing a remote server;
   detecting initiation of a substantially continuous communication between a first mobile device and a second mobile device;
   transmitting location data from the first mobile device to the remote server in the form of Advanced Forward Link Trilateration ("AFLT") measurements of a signal received from at least one base station by the first mobile device;
   determining at the remote server the location of at least one base station corresponding to the AFLT measurements;
   determining at the remote server the current location of the first mobile device based on the location of the at least one base station and the AFLT measurements in response to initiation of the substantially continuous communication between the first mobile device and the second mobile device; and
   transmitting the current location of the first mobile device to the second mobile device in response to initiation of the substantially continuous communication between the first mobile device and the second mobile device.

2. A computer-implemented mobile device calling method comprising:
   providing a remote server;
   detecting initiation of a substantially continuous communication between a first mobile device and a second mobile device;
   transmitting location data from the first mobile device to the remote server in the form of at least one base station ID;
   determining at the remote server the location of at least one base station based on the base station ID; and
   determining at the remote server the current location of the first mobile device based on the location of the at least one base station in response to initiation of the substantially continuous communication between the first mobile device and the second mobile device; and
   transmitting the current location of the first mobile device to the second mobile device in response to initiation of the substantially continuous communication between the first mobile device and the second mobile device.

3. A computer-implemented mobile device calling method comprising:
   providing a remote server;
   detecting initiation of a substantially continuous communication between a first mobile device and a second mobile device;
   receiving signals from a plurality of base stations corresponding to a plurality of base station IDs with the first mobile device;
   transmitting location data from the first mobile device to the remote server in the form of the plurality of base station IDs and corresponding signal strength measurements of the signals received from the plurality of base stations by the first mobile device;
   determining at the remote server the locations of the plurality of base stations corresponding to the plurality of base station IDs based on a database of a plurality of base station IDs and corresponding locations;
   determining at the remote server the current location of the first mobile device based on the locations of the plurality of base stations and the corresponding signal strength measurements in response to initiation of the substantially continuous communication between the first mobile device and the second mobile device; and
   transmitting the current location of the first mobile device to the second mobile device in response to initiation of the substantially continuous communication between the first mobile device and the second mobile device.

4. The computer-implemented method of claim 3, further comprising determining the current location of the first mobile device in response to initiation of the substantially continuous communication by the first mobile device to the second mobile device.

5. The computer-implemented method of claim 3, further comprising determining the current location of the first mobile device in response to initiation of the substantially continuous communication by the second mobile device to the first mobile device.

6. The computer-implemented method of claim 3, further comprising:
   determining a current location of the second mobile device in response to initiation of the substantially continuous communication between the first mobile device and the second mobile device; and
   transmitting the current location of the second mobile device to the first mobile device in response to initiation of the substantially continuous communication between the first mobile device and the second mobile device.

7. The computer-implemented method of claim 3, wherein at least one of the plurality of base stations carries the substantially continuous communication between the first mobile device and the second mobile device.

8. The computer-implemented method of claim 3, further comprising:
   determining a current location of the second mobile device in response to initiation of the substantially continuous communication by the first mobile device to the second mobile device; and
   transmitting the current location of the second mobile device to the first mobile device.

9. The computer-implemented method of claim 8, further comprising:
   transmitting a request to the second mobile device to provide at least one of the current location and location data corresponding to the current location of the second mobile device to the first mobile device;
   receiving at least one of the current location and location data corresponding to the current location and an authorization to provide the current location of the second mobile device to the first mobile device; and
   transmitting the current location of the second mobile device to the first mobile device in response to receiving the authorization.

10. The computer-implemented method of claim 3 further comprising:
- determining the current location of the first mobile device using a first method;
- transmitting the current location determined using the first method to the second mobile device;
- determining the current location of the first mobile device using a second method; and
- transmitting the current location determined using the second method to the second mobile device after transmitting the current location determined using the first method to the second mobile device.

11. The computer-implemented method of claim 3, further comprising:
- determining a change in the current location of the first mobile device; and
- transmitting the current location to the second mobile device in response to the change in the current location of the first mobile device during the substantially continuous communication between the first mobile device and the second mobile device.

12. The computer-implemented method of claim 3, further comprising:
- determining the current location of the first mobile device at a predetermined rate; and
- transmitting the current location of the first mobile device to the second mobile device at a predetermined rate during the substantially continuous communication between the first mobile device and the second mobile device.

13. The computer-implemented method of claim 3, further comprising transmitting the current location to a plurality of mobile devices including the second mobile device in response to initiation of the substantially continuous communication between the first mobile device and the second mobile device.

14. The computer-implemented method of claim 3, further comprising:
- receiving an eligible party indication corresponding to at least one authorized mobile device other than the second mobile device authorized to receive the current location of the first mobile device; and
- transmitting the current location to the at least one authorized mobile device other than the second mobile device in response to initiation of the substantially continuous communication between the first mobile device and the second mobile device.

15. The computer-implemented method of claim 3, further comprising transmitting the current location of the first mobile device to the second mobile device via TCP/IP communication protocol.

16. The computer-implemented method of claim 3, wherein transmitting the current location to the second mobile device comprises:
- transmitting a locate request from the first mobile device to the remote server;
- determining the current location of the first mobile device at the remote server in response to the locate request; and
- transmitting the current location from the remote server to the second mobile device.

17. The computer-implemented method of claim 3, further comprising transmitting the location data to the remote server via TCP/IP communication protocol.

18. The computer-implemented method of claim 3, further comprising transmitting the location data to the remote server using control-plane messaging on a cellular network.

19. The computer-implemented method of claim 3, further comprising transmitting the location data to the remote server via Signaling System No. 7 ("SS7") signaling.

20. The computer-implemented method of claim 3, further comprising:
- determining a geographic coordinate of the first mobile device in response to initiation of the substantially continuous communication between the first mobile device and the second mobile device;
- initiating a reverse geocoding of the geographic coordinate to determine at least one of an address and a map corresponding to the geographic coordinate; and
- transmitting the at least one of the address and the map to the second mobile device.

21. The computer-implemented method of claim 3, further comprising:
- determining a change in the current location of the first mobile device; and
- transmitting the current location to the second mobile device a plurality of times during the substantially continuous communication between the first mobile device and the second mobile device in response to the change in the current location of the first mobile device exceeding a predetermined threshold.

22. A computer-implemented mobile device calling method comprising:
- detecting initiation of a substantially continuous communication between a first mobile device and a second mobile device;
- determining a current location of the first mobile device in response to initiation of the substantially continuous communication between the first mobile device and the second mobile device;
- determining at least one of an address, a road, a locality, and a point of interest corresponding to the current location of the first mobile device;
- transmitting the current location of the first mobile device comprising the at least one of the address, the road, the locality, and the point of interest to the second mobile device in response to initiation of the substantially continuous communication between the first mobile device and the second mobile device;
- receiving from a user an eligible party indication comprising an indication of at least one receiving party which is eligible to receive location information from the first mobile device;
- storing at least one of the current location, the address, the road, the locality, and the point of interest corresponding to the current location of the first mobile device at the initiation of the substantially continuous communication;
- receiving a request from a requester for the at least one of the current location, the address, the road, the locality, and the point of interest corresponding to the current location of the first mobile device; and
- transmitting to the requester the at least one of the current location, the address, the road, the locality, and the point of interest in response to the requester corresponding to the eligible party indication.

23. A computer-implemented mobile device calling method comprising:
- detecting initiation of a substantially continuous communication between a first mobile device and a second mobile device;

determining a current location of the first mobile device in response to initiation of the substantially continuous communication between the first mobile device and the second mobile device;
transmitting an SMS message request to the second mobile device to provide at least one of the current location of the second mobile device and location data corresponding to the current location of the second mobile device to the first mobile device in response to initiation of the substantially continuous communication by the first mobile device to the second mobile device;
receiving at least one of the current location and location data corresponding to the current location of the second mobile device, and receiving an authorization to provide the current location of the second mobile device to the first mobile device;
determining a current location of the second mobile device;
transmitting the current location of the first mobile device to the second mobile device in response to initiation of the substantially continuous communication between the first mobile device and the second mobile device; and
transmitting the current location of the second mobile device to the first mobile device in response to receiving the authorization.

24. A computer-implemented mobile device calling method comprising:
providing a remote server;
receiving from a first mobile device with the remote server at least one of location data and data indicative of the initiation of a substantially continuous communication between the first mobile device and a second mobile device;
detecting initiation of the substantially continuous communication between the first mobile device and the second mobile device;
determining a geographic coordinate of the first mobile device using the remote server in response to initiation of the substantially continuous communication between the first mobile device and the second mobile device;
initiating a reverse geocoding of the geographic coordinate using the remote server to determine at least one of an address and a map corresponding to the geographic coordinate; and
transmitting the at least one of the address and the map to the second mobile device using the remote server in response to initiation of the substantially continuous communication between the first mobile device and the second mobile device.

25. The computer-implemented method of claim 24, further comprising:
receiving from a user an eligible party indication comprising an indication of at least one receiving party which is eligible to receive location information from the first mobile device; and
transmitting the at least one of the address and the map to the second mobile device in response to the second mobile device corresponding to the eligible party indication.

26. The computer-implemented method of claim 24, further comprising:
receiving from a user an eligible party indication comprising at least one telephone number corresponding to at least one party which is eligible to receive location information from the first mobile device; and
transmitting the at least one of the address and the map to the second mobile device in response to a telephone number of the second mobile device corresponding to the eligible party indication.

27. The computer-implemented method of claim 24, further comprising determining the geographic coordinate of the first mobile device based on a GPS fix.

28. The computer-implemented method of claim 24, further comprising determining the geographic coordinate of the first mobile device based on a signal received from at least one base station by the first mobile device and data which indicates a location of the at least one base station.

29. The computer-implemented method of claim 24, wherein determining the geographic coordinate of the first mobile device comprises determining at least one base station from which a signal is received by the first mobile device and a length of time for a signal to arrive to the first mobile device from the at least one base station.

30. The computer-implemented method of claim 24, further comprising determining the geographic coordinate of the first mobile device based on a Timing Advance set by a base station in communication with the first mobile device.

31. The computer-implemented method of claim 24, further comprising transmitting the at least one of the address and the map of the first mobile device to the second mobile device in an SMS message.

32. The computer-implemented method of claim 24, further comprising:
sending a reverse geocoding request including the geographic coordinate to another remote server;
receiving data corresponding to the at least one of the address and the map from the other remote server; and
transmitting the data corresponding to the at least one of the address and the map to the second mobile device.

33. The computer-implemented method of claim 24, wherein the substantially continuous communication comprises a voice call.

34. The computer-implemented method of claim 33, wherein the voice call comprises a telephone call.

35. A network connectable system for managing distribution of location information between mobile devices comprising at least one computing device including at least one memory comprising instructions operable to enable the computing device to perform a procedure comprising:
receiving from a first mobile device via a network at least one of location data and data indicative of the initiation of a substantially continuous communication between the first mobile device and a second mobile device;
detecting initiation of the substantially continuous communication between the first mobile device and the second mobile device;
determining a geographic coordinate of the first mobile device in response to initiation of the substantially continuous communication between the first mobile device and the second mobile device;
initiating a reverse geocoding of the geographic coordinate to determine at least one of an address and a map corresponding to the geographic coordinate; and
transmitting the at least one of the address and the map to the second mobile device in response to initiation of the substantially continuous communication between the first mobile device and the second mobile device.

36. Non-transitory computer-readable media tangibly embodying a program of instructions executable by a computing device to implement a method, the computing device being capable of interfacing with a communications network, the method comprising:
receiving from a first mobile device via a network at least one of location data and data indicative of the initiation of a substantially continuous communication between the first mobile device and a second mobile device;

detecting initiation of the substantially continuous communication between the first mobile device and the second mobile device;

determining a geographic coordinate of the first mobile device in response to initiation of the substantially continuous communication between the first mobile device and the second mobile device;

initiating a reverse geocoding of the geographic coordinate to determine at least one of an address and a map corresponding to the geographic coordinate; and transmitting the at least one of the address and the map to the second mobile device in response to initiation of the substantially continuous communication between the first mobile device and the second mobile device.

37. A mobile device comprising at least one computing device including at least one memory comprising instructions operable to enable the computing device to perform a procedure comprising:

detecting initiation of a substantially continuous communication between a first mobile device and a second mobile device;

determining a current location of the first mobile device in response to initiation of the substantially continuous communication between the first mobile device and the second mobile device;

transmitting an SMS message request to the second mobile device to provide at least one of the current location of the second mobile device and location data corresponding to the current location of the second mobile device to the first mobile device in response to initiation of the substantially continuous communication by the first mobile device to the second mobile device;

receiving at least one of the current location and location data corresponding to the current location of the second mobile device, and receiving an authorization to provide the current location of the second mobile device to the first mobile device;

determining a current location of the second mobile device;

transmitting the current location of the first mobile device to the second mobile device in response to initiation of the substantially continuous communication between the first mobile device and the second mobile device; and transmitting the current location of the second mobile device to the first mobile device in response to receiving the authorization.

38. A computer-implemented mobile device calling method comprising:

providing a remote server;

detecting initiation of a substantially continuous communication between a first mobile device and a second mobile device;

transmitting GPS fix data from the first mobile device to the remote server;

determining the current location of the first mobile device at the remote server based on the GPS fix in response to initiation of the substantially continuous communication between the first mobile device and the second mobile device; and transmitting the current location of the first mobile device from the remote server to the second mobile device in response to initiation of the substantially continuous communication between the first mobile device and the second mobile device.

39. The computer-implemented method of claim 38, further comprising determining the current location of the first mobile device based on a GPS fix obtained based on signals received from GPS satellites, predetermined ephemeris data and predetermined almanac data.

40. The computer-implemented method of claim 38, further comprising:

receiving an authorization to provide the current location to at least one application; and providing access to the current location by the at least one application.

41. The computer-implemented method of claim 38, further comprising using the second mobile device to display a map showing the current location of the first mobile device.

42. The computer-implemented method of claim 38, further comprising using the second mobile device to retrieve map data corresponding to the current location of the first mobile device from the remote server.

43. The computer-implemented method of claim 38, further comprising:

determining the current location of the first mobile device at least one of at a predetermined rate and in response to a detected change in location of the first mobile device at times at which no communication is occurring between the first mobile device and the second mobile device or another mobile device;

transmitting the current location to the second mobile device at least one of at a predetermined rate and in response to a detected change in location of the first mobile device at times at which no communication is occurring between the first mobile device and the second mobile device;

retrieving and storing with the second mobile device at least one of address data and map data corresponding to the current location of the first mobile device; and displaying the at least one of address data and map data corresponding to the current location of the first mobile device in response to initiation of the communication between the first mobile device and the second mobile device.

44. The computer-implemented method of claim 43, further comprising using the second mobile device to cache at least one of address data and map data corresponding to the current location of the first mobile device during a time at which no communication is occurring between the first mobile device and the second mobile device prior to initiation of the communication between the first mobile device and the second mobile device.

45. A computer-implemented mobile device calling method comprising:

providing a remote server;

detecting initiation of a substantially continuous communication between a first mobile device and a second mobile device;

determining a geographic coordinate of the first mobile device using the remote server in response to initiation of the substantially continuous communication between the first mobile device and the second mobile device;

using the remote server to determine at least one of an address and a map corresponding to the geographic coordinate; and transmitting the at least one of the address and the map to the second mobile device using the remote server in response to initiation of the substantially continuous communication between the first mobile device and the second mobile device.

46. A computer-implemented mobile device calling method comprising:
- providing a remote server;
- detecting initiation of a substantially continuous communication between a first mobile device and a second mobile device;
- transmitting location data from the first mobile device to the remote server in the form of at least one geographic coordinate;
- determining at the remote server the location of at least one base station based on the at least one geographic coordinate; and
- determining at the remote server the current location of the first mobile device based on the at least one geographic coordinate in response to initiation of the substantially continuous communication between the first mobile device and the second mobile device; and
- transmitting the current location of the first mobile device to the second mobile device in response to initiation of the substantially continuous communication between the first mobile device and the second mobile device.

47. A computer-implemented mobile device calling method comprising:
- providing a remote server;
- detecting initiation of a substantially continuous communication between a first mobile device and a second mobile device;
- transmitting location data from the first mobile device to the remote server in the form of base station radio parameters;
- determining at the remote server the current location of the first mobile device based on the base station radio parameters in response to initiation of the substantially continuous communication between the first mobile device and the second mobile device; and
- transmitting the current location of the first mobile device to the second mobile device in response to initiation of the substantially continuous communication between the first mobile device and the second mobile device.

48. The computer-implemented method of claim 47, further comprising requesting the current location of the first mobile device from a telecommunication carrier location resource.

49. The computer-implemented method of claim 47, further comprising determining:
- at least one of an address, a road, a locality, and a point of interest corresponding to the current location of the first mobile device; and
- transmitting the at least one of the address, the road, the locality, and the point of interest to the second mobile device.

50. The computer-implemented method of claim 49, further comprising transmitting a telephone number of the first mobile device and the at least one of the address, the road, the locality, and the point of interest corresponding to the current location of the first mobile device to the second mobile device as an application-directed SMS.

* * * * *